April 18, 1967     J. C. WOLD     3,314,169
EDUCATIONAL DEVICE
Filed Dec. 23, 1964     3 Sheets-Sheet 1

INVENTOR.
JOSEPH C. WOLD
BY James D. Girman Jr.
AGENT

April 18, 1967 J. C. WOLD 3,314,169
EDUCATIONAL DEVICE
Filed Dec. 23, 1964 3 Sheets-Sheet 2
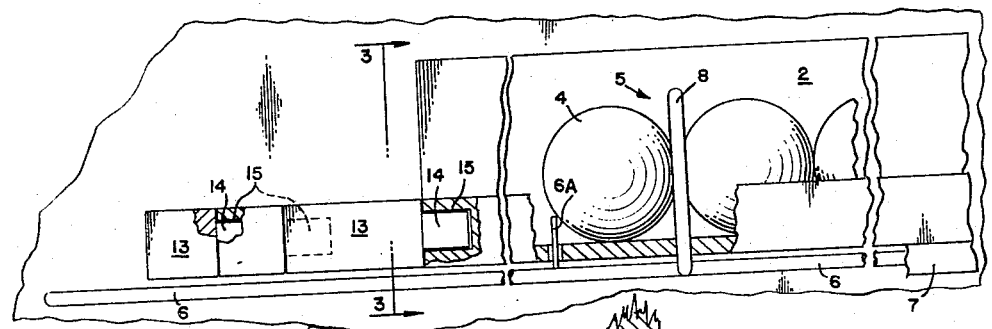
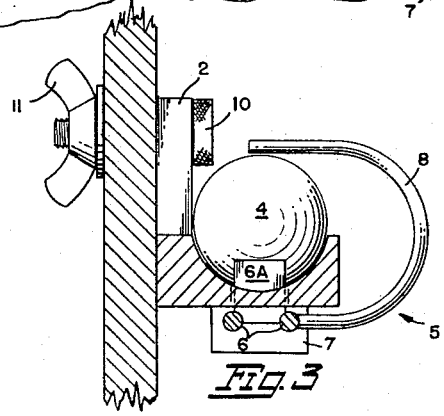
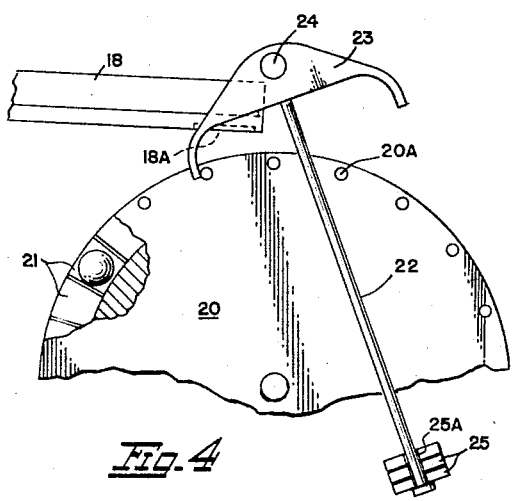
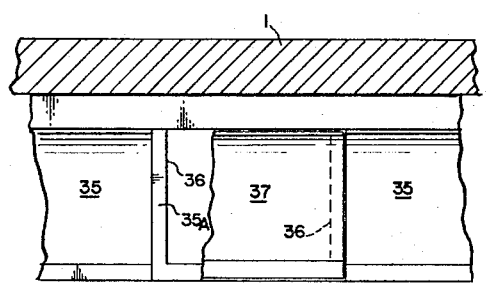
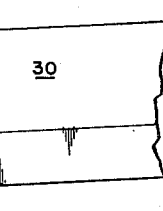
JOSEPH C. WOLD
INVENTOR.
BY *James D. Girnan Jr.*
AGENT April 18, 1967     J. C. WOLD     3,314,169
EDUCATIONAL DEVICE Filed Dec. 23, 1964     3 Sheets-Sheet 3

JOSEPH C. WOLD
INVENTOR.

BY James D. Sirman Jr.
AGENT

United States Patent Office 3,314,169
Patented Apr. 18, 1967

3,314,169
EDUCATIONAL DEVICE
Joseph C. Wold, 560 W. 24th St.,
Eugene, Oreg. 97405
Filed Dec. 23, 1964, Ser. No. 420,670
4 Claims. (Cl. 35—32)

This invention relates to educational devices and more particularly to teaching aids for the demonstration of certain of the physical laws and also of the fundamental concept of the binary number system.

It is one of the principal objects of this invention to provide a plurality of functionally related devices mounted upon a common vertically disposed supporting surface and sequentially operated by the kinetic energy of a rolling ball in its downward gravitational course toward a position of rest.

Another object is the provision of means which permits the acceleration, interval and course of successive balls to be varied, thus enabling an instructor or student to demonstrate the application of certain physical laws. This feature is particularly helpful in arousing the student's interest since it allows experimentation with applicable formulas on his own behalf as well as providing a tangible result of such experimentation. Important in achieving this object is the means provided which allows critical variations to be made in the speed and distance traveled by each ball.

Another object is the provision of an educational device which may be used solely for entertainment purposes in which several persons may competitively participate or by a child simply as a device having many working parts and hence fascinating to watch.

A still further object of this device is the structure capable of graphically displaying to those unfamiliar with the binary number system its basic concept of a base of two and of the binary members up to 31. Additionally, the application of the binary number system by an electronic computer machine may be demonstrated.

Further study of the following specification and accompanying drawings will make apparent other objects and purposes of this invention which reside in the combination and arrangement of parts and in the details of construction hereinafter described and claimed.

With reference to the drawings:

FIGURE 2 is an enlarged, fragmentary detail view of a first track member, with parts broken away for convenience of illustration.

FIGURE 3 is a sectional detail view of a track member and ball release mechanism associated therewith taken approximately along the line 3—3 of FIGURE 2.

FIGURE 4 is an enlarged fragmentary detail view of an escape mechanism including a pendulum.

FIGURE 5 is a side elevational view, on an enlarged scale, of a ball-distributing gate mechanism.

FIGURE 6 is an enlarged fragmentary plan view of a track section, and closure plate therefor, taken approximately along line 6—6 of FIGURE 1.

Figure 1:
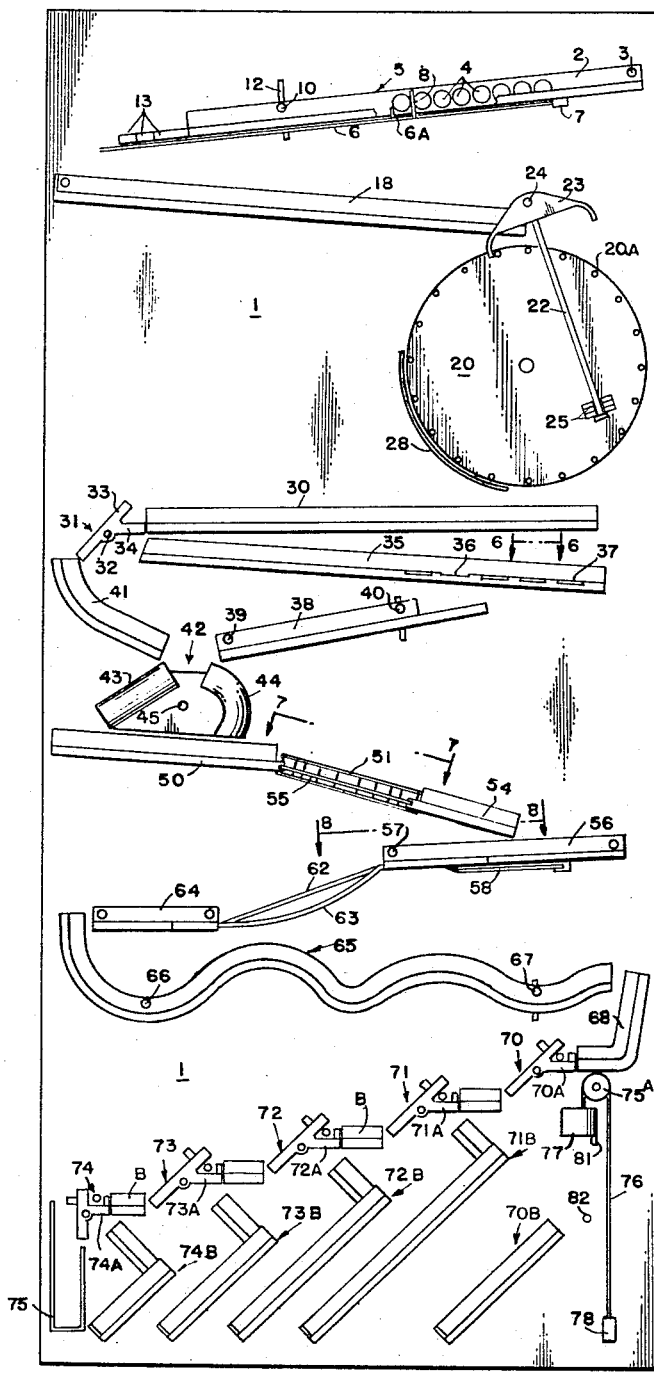
FIGURE 1 is a front elevational view of the various components of the invention assembled on a supporting panel.
Figure 7:
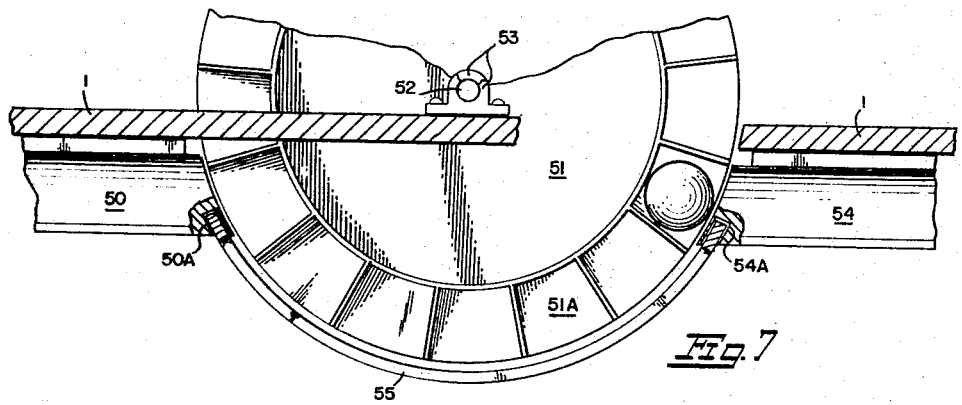
FIGURE 7 is a sectional view of an inclined turntable and track members leading into and away therefrom as viewed along line 7—7 of FIGURE 1.
Figure 8:
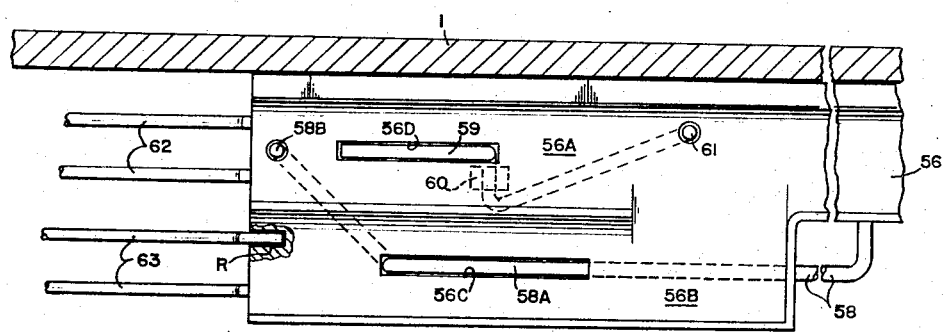
FIGURE 8 is a fragmentary top plan view of ball separation and releasing means taken approximately along the line 8—8 of FIGURE 1.

With continuing reference to the drawings, wherein like reference numerals designate like parts and to facilitate an understanding of the sequential functioning of the invention I hereinafter sometimes refer to the individual, though functionally related, components assembled on the supporting panel shown in FIGURE 1 as being located in progressive operational zones from the top to the bottom thereof generally as follows:

FIGS. 2 and 3, ball storage zone.
FIG. 4, a first ball-transfer zone.
FIG. 5, ball distributing zone.
FIG. 7, a second ball-transfer zone.
FIG. 8, ball separation zone superjacent a third transfer zone, and
FIG. 9, a ball-sorting terminal zone.

With further reference to FIGURE 1, reference numeral 1 indicates generally an elongated upright supporting panel having means provided on its back side (not shown) for its support in a vertical or near vertical position.

In the ball-storage zone, a first track member 2 is tiltably attached at its upper end as at 3 near the upper end of the panel 1 and provides a storage rack for a number of ball members 4 and also as a support for a ball-release mechanism indicated generally at 5 consisting of an elongated flexible wire raceway 6 secured at one of its ends to a mounting block 7 on the underside of the track member 2. As best shown in FIGURES 2 and 3, the ball-release 5 further comprises a first limit stop in the form of a plate 6A spaced apart from a normally open or raised second limit stop in the form of a bail 8 both secured in perpendicular relationship to the raceway 6. The track member 2 is adjustably supported near its opposite end by a bolt 10 extending through an arcuate slot 12 in the panel 1 and is provided with a knurled head and a wing nut 11, which permits the angle of track inclination to be readily varied.

Track segments 13, of varying lengths, are provided with pairs of arms 14 and matching openings 15, as is the track member 2, permitting variations in the distance a ball must travel before depressing the raceway 6 to actuate the escape mechanism 5 and so enabling the interval between each ball of a series to be pre-selected.

A first ball transfer zone includes a second inclined track member 18 fixedly secured to the panel 1 and receives the ball members 4 at intervals from the raceway 6. The lower end of the track member 18 is positioned adjacent the upper center of a power wheel 20 and is provided with an opening 18A. As shown in FIGURE 4, the wheel 20 is provided with ball receiving pockets 21 circumferentially spaced thereabout and which, upon being asymmetrically loaded by deposit of a ball therein, the wheel will rotate in a counterclockwise direction demonstrating the gravitating ball's ability to perform work in a vertical or near vertical plane.

Spaced about the periphery of the wheel are pegs 20A constituting a part of an escape mechanism. The speed of roation of the wheel 20 is governed by the escape mechanism consisting of a pendulum 22 and pallet 23 in alternate and progressive rocking engagement with pegs 20A and which are swingably mounted in spaced relationship to the supporting panel 1 by a bearing post 24. The pendulum is put in motion prior to the release of the balls 4 and will remain in motion throughout the short duration of the passage of the balls past the wheel 20. The balls 4 are retained within their respective pockets 21 on the overbalanced side of the wheel 20 by a concentric keeper 29 during their downward passage to the bottom end of the keeper where they are released to drop onto a third track member 30 also fixedly secured to the panel 1. Pendulum weights 25 are provided with slots 25A to permit the instructor to demonstrate the effect of various pendulum weights on the speed and travel of the pendulum.

A gate, indicated generally at 31, substantially U-shaped in section as at 33, is rockably mounted to the base 1 by a pin 32, as best shown in FIGURE 5, and constitutes the first member encountered by a descending ball member within the ball-distributing zone. The underside of the gate 31 is provided with an angularly disposed integral arm 34 of similar cross section. Means are thus provided for the diverting alternate descending ball members for purposes hereinafter described. Lugs 33A and 34A (FIGURE 5) formed on the upper end lower portions of the guideway 33 and arm 34 respectively function as limit stops as they alternately engage the discharge end of the third track member 30. The gate 31 is described as being in a closed position when its guideway 33 is in register with the lower end of track member 30 and, conversely, in an open position when the arm 34 is in register with the track member. One end of a track section 35 (FIGURE 1) is arranged subjacent the lower end of track 30 and adjacent the arm 34 for the reception of a ball when the gate is swung (to a closed position) by the weight of a ball therein to align arm 34 with track section 35.

As best shown in FIGURE 6, openings 36 are formed at spaced intervals along the lower half of the track section 35 which may be selectively provided with inset closure plates 37 supported by the recessed marginal edges 35A of the openings. Thus the distance a ball must travel before reaching a collision area, hereinafter described, may be varied. A converging track section 38 subjacent track section 35 is swingably attached as at 39 and 40 to the panel 1 in a manner similar to the first track member and also, like the first track member, provided with openings (not shown) for the addition of track segments similar to those indicated at 13. A curved track section 41 is provided below the discharge end of guideway 33 in gate 31 for the conveyance of alternate ball members to the collision area indicated generally at 42. Below the collision area are a pair of integral tunnel-like conduits 43–44 secured to the base by means of a bolt 45 and which conduits are of sufficient cross-section to receive either one or both of the balls regardless of the manner in which they collide.

A second ball transfer zone comprises a track member 50 which serves as a feed for an inclined turntable 51 rotatably supported by shaft 52 journaled in a pair of bearing blocks 53 affixed to the back side of the panel 1, as shown in FIGURE 7. The turntable 51 is segmented into ball receptacles 51A and is rotated from a ball receiving position adjacent track member 50 to a discharge position at the upper end of a track member 54 which conveys the balls downwardly to a ball-dividing zone. The ball is confined within the receptacle 51A by an arcuate fence 55 intermediate the turntable ends of track members 50 and 54 and attached thereto within apertures 50A and 54A.

The ball separation zone (FIGURE 8) includes an upper track member 56 which leads into a pair of ways 56A–56B which are provided with simultaneous releasing means, hereinafter described, for momentarily stopping a first ball within the way 56A and simultaneously releasing it, with a second ball traversing way 56B, onto a pair of straight and curved inclined rails 62 and 63 respectively. With continuing reference to FIGURE 8, the ways 56A–56B are shown as including a flexible wire arm 58 mounted on the underside of the track member 56 and extending angularly upward through a slot 56C in the way 56B to provide a raised trigger portion 58A for actuating a barrier 58b within the other way 56A and formed from the upturned end portion of the arm 58. A rocker arm 59 is rockably mounted as at 60 to the underside of way 56A and normally extends upwardly through a slot 56D into way 56A whereupon the weight of a stopped first ball will depress the rocker arm to raise its opposite end 61 into position to deflect a following or second ball to divert it into way 56B for the sequence as above described. The pairs of wire rails 62 and 63 terminate at their upper ends within recesses R formed in the ways 56A–56B as do their lower ends within a pair of matching ways (not shown) in a lower track member 64.

The lower end of track member 64 is disposed above one end of an undulating track member 65 which comprises the third ball transfer zone and is formed with a series of undulations and secured to the base 1 at 66 and 67 in the same manner as tracks 2 and 38, thus permitting its discharge end to be raised or lowered.

Figure 9:
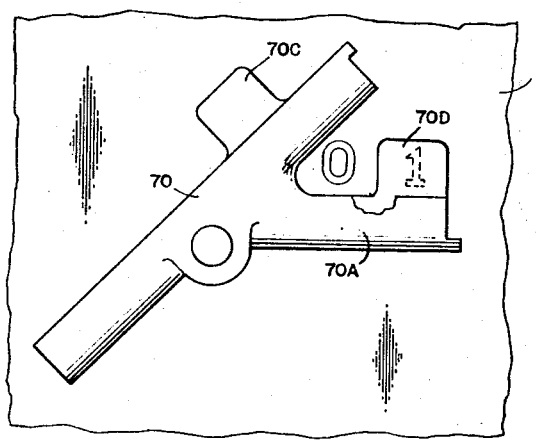
FIGURE 9 is a side elevational view on an enlarged scale of one of a series of ball-sorting gates.

An angular track section 68 provides a feed-in to a ball sorting zone which includes a series of four identical gates and a terminal gate indicated at 70, 71, 72, 73 and 74 respectively, which direct alternate balls into their adjacent storage racks 70b, 71b, 72b, 73b, 74b and a terminal storage rack 75. A typical gate of the series is shown at FIGURE 9 and is similar to the first mentioned gate 31 except for a pair of vertical projections 70c and 70d which function to alternately expose the numerals "0" and "1" inscribed or printed on the face of the panel 1. The terminal gate 74 is also provided with a pair of vertical projections for the same purpose. Each of the gates 70–74 is provided with an arm 70A, 71A, 72A, 73A and 74A. The series of gates 70–73 and terminal gate 74 within the ball sorting zone provide means for the demonstration of the binary number system as hereinafter described. Bridges B serve as transfer means between gates.

A pulley mechanism comprising a pulley 75A over which a cord 76 is entrained is provided at its ends with a receptacle 77 and counter-weight 78. The receptacle 77 receives the ball discharged from the arm of the gate 70 upon its downward swing. A projection 81 extends downwardly from the base of the receptacle to strike a dowel 82 extending from the panel into the receptacle's path of movement to cause the upsetting thereof and to discharge the ball into chute or storage rack 70b. The pulley mechanism provides no part of the binary display and is simply a demonstration of another form of work a gravitating ball can do.

In operation a plurality of balls are placed in the track member 2 and retained in place by the plate 6A until a first ball when manually released depresses raceway 6 after traversing the track member 2 and segments 13 attached thereto to actuate the ball release mechanism 5. The ball members 4 are progressively deposited onto track member 18, pockets 21 of the wheel 20 and onto track member 30 all of which constitutes a first ball-transfer zone. The intermittent rotation of the loaded wheel 20, similar to that of an escape wheel of a clock, will cause the balls to be discharged onto the track member 30 at the same interval as received by the wheel. Weights 25, by means of slots 25A, may be conveniently added or removed from the pendulum 22 for the purpose of demonstrating their effect on the speed and travel thereof, and the resultant escapement of the wheel 20, as aforementioned.

Gate 31, as shown within the ball-distributing zone, upon receiving a ball from the track member 30 will position itself to direct a following ball in an opposite direction. By varying the distance the ball must travel (track section 35) and its speed (track member 38), the instructor or student may demonstrate their calculations to effect a collision of successive balls, or to demonstrate the minimum speed required for a ball to cross or "jump" the collision area 42.

The inclined turntable 51 receives a ball from track member 50 in an off-center position (FIGURE 7) and is rotated by the kinetic energy of the ball to an off-center discharge position onto track member 54, all of which comprise a second ball-transfer zone which demonstrates the ability of a gravitating ball to perform work in other than a vertical course of travel.

The simultaneous release means within the ball-separation zone, as provided in ways 56A–56B in conjunction with the two pairs of rails 62–63 enable the demonstration of a comparison of the speed of a ball descending a curved incline with one descending a straight incline.

The gates 70 through 73 and terminal gate 74 provide means for demonstrating the basic concept of the binary number system and in a general way its application by electronic computing machines. The gates 70–74 can be related to the open or closed number display relays of a computer and each of the balls 4 to an electrical impulse which closes or opens one or more relays. For example, the binary number zero is indicated by the series of five "0's" (FIGURE 1) displayed by the support when each of the gates are in an open position. The first ball swings gate 70 downwardly to reveal the number "1" (FIGURE 9) and the series of numbers across the panel will now read (from left to right) 00001 or the binary number 1. The second ball will open gate 70 and close gate 71 to display the binary 2 or 00010, and the third ball will close gate 70 again to display 00011 which is the binary number three. The fourth ball will traverse gates 70 and 71, opening them and closing gate 72 to cause 00100 or the binary 4 to be displayed. The gates 70–74 and the related binary number display are of particular value in the teaching of the binary number system and its adaptability to computer use. The value of the series of gates as a teaching aid is enhanced by its ability to function automatically.

While I have shown a particular form of embodiment of my invention, I am aware that many minor changes therein will readily suggest themselves to others skilled in the art without departing from the spirit and scope of the invention. Having thus described my invention, what I claim as new and desire to protect by Letters Patent is:

1. An educational device operated by ball members for demonstrating certain physical laws and also for demonstrating the binary number system, said device comprising:

a substantially vertically disposed supporting panel divided progressively downward into a ball-storage zone, a first ball-transfer zone, a ball-distributing zone, a second ball-transfer zone, a ball separation zone, a third ball-transfer zone and a ball-sorting terminal zone, said ball storage zone including primary ball-storing track means and including flexible ball actuated means attached thereto for progressively releasing the stored ball members at intervals into said first ball-transfer zone, said first ball-transfer zone including a wheel having circumferential pockets and escapement means controlling wheel rotation, said ball distributing zone including diverging track sections and a ball actuated gate for alternately directing successive ball members onto one of said diverging track sections, a converging track member downwardly inclined toward one of said diverging track sections to provide a collision area, means below the collision area for guiding the gravitating ball members into a subjacent said second ball transfer zone, said second ball-transfer zone including a segmented inclined turntable and a pair of track members, one of said track members adjacent the highest side of said turntable and the other adjacent the lower side of said turntable for directing the ball members into said ball-separation zone, said ball-separation zone including a track member having a plurality of ways formed therein and means within one of said ways of stopping a descending ball member therein, trigger means disposed within another of said ways for releasing the stopped ball member, rails in communication with said ways and with ways of a lower track member superjacent a third ball-transfer zone, said third ball-transfer zone including an undulating track member having its lower or discharge end adjacent a ball sorting terminal zone, said ball sorting terminal zone comprising a series of gates in inclined relationship to one another wherein each of said gates comprises a guideway and an angularly disposed arm for directing the ball members received thereby in diverging directions, and means for receiving and storing the ball members.

2. An educational device operated by gravitating ball members for demonstrating certain physical laws and including means for demonstrating the binary number system, said device comprising:

a substantially vertically disposed supporting panel, a storage rack comprising a first inclined track member having an elongated raceway secured at one of its ends thereto, means carried by the raceway to release the ball members at intervals, a wheel rotatably carried by the panel provided with circumferentially spaced pockets, second and third inclined track members each having one end disposed adjacent the top and the bottom center of the wheel for the respective delivery and reception of the ball members to and from said wheel, a gate swingably supported by said panel at the opposite end of said third track member and having a longitudinal guideway extending therealong and also provided with an angularly disposed ball-receiving arm, said arm and said guideway adapted to alternately receive successively descending ball members, a pair of inclined track sections beneath said gate to receive ball members therefrom in alternate sequence, a converging track member subjacent one of said inclined track sections to receive ball members therefrom and terminating adjacent a collision area, ball-receiving and conveying means subjacent said collision area, an inclined segmented turntable carried by the panel to receive gravitating ball members from said receiving and conveying means, a ball receiving track member adjacent one side and below said turntable, a ball-separation mechanism comprising upper and lower inclined track members and a plurality of downwardly inclined rails interconnecting said upper and lower inclined track member and each of said upper and lower inclined track members provided with a plurality of ways and one of said ways in said upper track member having arresting means for momentarily stopping the downward travel of a ball member and another of said ways having trigger means for actuating said arresting means to simultaneously release the stopped ball member with another ball member for the travel of both ball members to said lower track member, an undulating track member below said ball-separation mechanism for the reception of ball members therefrom having an upper end adjacent the lower end of said lower track member of said ball separation mechanism, a ball-sorting terminal zone comprising a series of ball actuated gates in downwardly inclined relationship and each gate of the series swingably attached to the support panel intermediate its ends and each gate having a guideway extending the length thereof and an angularly disposed ball receiving arm, terminal ball storage means disposed below said gates for receiving ball members gravitating downwardly from the gates.

3. In an educational device, the improvement comprising:

exposed inclined track means mounted upon a panel for conveying gravitating ball members in an exposed manner, a series of normally balanced spaced apart ball actuated gate members each having a guideway extending the length thereof and an angularly disposed arm both said guideway and said arm being of channel form in section to receive and guide a rolling ball member, means rockably mounting said gate members to said supporting panel in downwardly inclined relationship to each other, bridge members interposed between said gate members in a substantially horizontal manner for directing ball members progressively one at a time to said gate members said bridge members being also of channel form in section, each of said gate members overbalanced gravitationally by the weight of its respective transistory ball member to an open or closed position, and ball receiving means arranged subjacent said series of gate members and adapted to receive the ball members as they are progressively switched by the overbalance of each gate member.

4. In an educational device including inclined track means carried by an upright support for conveying gravitating ball members; the improvement comprising:

an upper track member and a lower track member, a plurality of ways formed within each of said upper and lower track members, elongate flexible means carried by said upper track member and extending into one of the ways formed therein for a portion of its length to form a trigger and said means further extending into another of said ways to form a ball member barrier, whereby a descending ball in one way of the upper track member will depress said trigger to release an arrested ball in another of said ways in the upper track member for simultaneous release thereof from the ways of said upper track member.

References Cited by the Examiner

UNITED STATES PATENTS 2,115,620  4/1938  Cave.
3,006,082  10/1961  Libbey _____ 35—30

EUGENE R. CAPOZIO, *Primary Examiner.*

W. GRIEB, *Assistant Examiner.*